(12) United States Patent
Lampert

(10) Patent No.: US 12,105,927 B2
(45) Date of Patent: Oct. 1, 2024

(54) METHOD AND SYSTEM FOR DISPLAYING AND INTERACTING WITH USER GENERATED CONTENT IN THREE-DIMENSIONS

(71) Applicant: David Lampert, Los Angeles, CA (US)

(72) Inventor: David Lampert, Los Angeles, CA (US)

(73) Assignee: Gifft, Inc., Los Angeles, CA (US)

( * ) Notice: Subject to any disclaimer, the term of this patent is extended or adjusted under 35 U.S.C. 154(b) by 0 days.

(21) Appl. No.: 18/584,362

(22) Filed: Feb. 22, 2024

(65) Prior Publication Data

US 2024/0288987 A1 Aug. 29, 2024

Related U.S. Application Data

(60) Provisional application No. 63/447,724, filed on Feb. 23, 2023.

(51) Int. Cl.
| | |
|---|---|
| *G06F 3/04815* | (2022.01) |
| *G06F 3/01* | (2006.01) |
| *G06F 3/04845* | (2022.01) |
| *G06F 3/0488* | (2022.01) |
| *G06T 19/00* | (2011.01) |
| *G06T 19/20* | (2011.01) |

(52) U.S. Cl.
CPC ......... *G06F 3/04815* (2013.01); *G06F 3/011* (2013.01); *G06F 3/04845* (2013.01); *G06F 3/0488* (2013.01); *G06T 19/003* (2013.01); *G06T 19/20* (2013.01); *G06T 2200/24* (2013.01); *G06T 2219/2021* (2013.01)

(58) Field of Classification Search
CPC .... G06F 3/011; G06F 3/04815; G06F 3/0488; G06F 3/04845; G06T 19/20; G06T 2200/24; G06T 2219/2021; G06T 19/003
See application file for complete search history.

(56) References Cited

U.S. PATENT DOCUMENTS

| 11,250,617 B1 * | 2/2022 | Sempe | H04L 65/611 |
| 2023/0347244 A1 * | 11/2023 | Chen | A63F 13/58 |
| 2024/0112399 A1 * | 4/2024 | Ramani | G06V 40/11 |

* cited by examiner

*Primary Examiner* — Muhammad N Edun
(74) *Attorney, Agent, or Firm* — Sam Pierce

(57) ABSTRACT

The present invention relates to a computer-implemented method and system for enhancing display and interaction with user-generated content within a 3D environment on digital platforms. This invention uniquely arranges a multitude of interactive elements in a 3D grid along the X, Y, and Z axes, enabling users to navigate through a dynamic digital scene. A virtual camera, positioned to face this grid, automatically pans through the 3D space or responds to user inputs for manual navigation, providing a seamless and immersive content viewing experience. The system is characterized by its ability to dynamically manage content via customizable vector shapes for interactive elements, gesture recognition for navigation, and an AI-driven recommendation engine for personalized content delivery. This invention leverages Swift's 3D rendering capabilities and the iOS SceneKit for efficient management of 3D objects and animations, ensuring a responsive platform for exploring user-generated content.

8 Claims, 3 Drawing Sheets

METHOD AND SYSTEM FOR DISPLAYING AND INTERACTING WITH USER GENERATED CONTENT IN THREE-DIMENSIONS

BACKGROUND

This invention pertains to the technical field of digital user interfaces, with a particular focus on methods and systems for interacting with and displaying images within a three-dimensional 3D environment on digital platforms. The innovation is centered on enhancing user engagement and interaction with digital content, leveraging the spatial dynamics of 3D presentation.

Prior art includes various technologies aimed at enhancing user interaction with digital content. Notably, Apple Inc.'s patent (U.S. Ser. No. 11/138,798B2) for devices, methods, and graphical user interfaces for displaying objects in a 3D context introduces methods for manipulating virtual objects in augmented reality (AR) environments. Similarly, the augmented reality device patent application (20230098951) explores the integration of digital content within real-world settings via AR. These developments highlight a growing interest in immersive digital experiences, focusing on the seamless incorporation of 3D objects and AR into user interfaces. Additionally, the patent application (20140168205) details a method for presenting images in a scrolling 3D format.

These inventions each target important issues but fail to address the specific challenges associated with navigating and interacting with user-generated content in online platforms, where the conventional two-dimensional (2D) interfaces may limit user engagement and efficiency due to their flat and often cluttered nature.

There exists an unmet need for an innovative approach to display and interact with user-generated content that overcomes the limitations of traditional 2D interfaces. Users seek a more immersive and efficient way to browse and select content without the constraints of flat navigation systems.

The primary objective of this invention is to introduce a novel 3D portal that significantly deviates from traditional 2D scrolling interfaces by implementing a 3D grid-like view for displaying user-generated content. This approach aims to provide a more immersive browsing experience, allowing users to navigate through a larger volume of content with fewer interactions, enhancing the visibility and interactivity of digital platforms.

The invention offers several improvements over existing solutions, including: increased content visibility via a 3D grid, wherein the portal interface can display over 40 images simultaneously, surpassing the capacity of conventional 2D displays; enhanced interactivity and efficiency by enabling users to reach the 200th piece of content with a single swipe; and an immersive experience facilitated by the portal interface creating a novel way to interact with digital content, potentially increasing user retention and satisfaction.

The present invention addresses the limitations of current content display and navigation technologies by leveraging a 3D grid of interactive elements, a centrally placed camera for dynamic content exploration, and interactive elements for user engagement. This comprehensive system not only enhances the efficiency of content navigation but also offers a personalized and immersive user experience. Through its innovative design and operational capabilities, the invention sets a new standard for digital content interaction, marking a significant departure from the constraints of traditional 2D interfaces.

SUMMARY

In view of the circumstances outlined above, aspects of the present invention disclose a computer-implemented method and system for displaying user-generated content within a 3D environment on digital platforms. It represents a significant advancement in the technical field of digital user interfaces, specifically targeting the enhancement of user interaction and content navigation within online platforms.

Existing technologies, such as those related to augmented reality (AR) devices and interfaces, have primarily focused on AR environments and the manipulation of virtual objects. However, these do not adequately address the challenges of navigating and selecting user-generated content in online platforms, where traditional two-dimensional (2D) interfaces may limit user engagement due to their flat and cluttered nature. This invention solves these issues by implementing a 3D portal that allows for a more immersive and efficient browsing experience, overcoming the limitations of conventional 2D interfaces.

The invention's innovative aspects include: a 3D grid of interactive elements (app shapes) arranged along X, Y, and Z axes within a digital scene, enhancing content visibility and interactivity; a virtual camera positioned to dynamically explore content through automatic panning or user-directed navigation; customizable vector shapes for interactive elements, enhancing depth perception and providing a dynamic presentation of content; advanced user interface features enabling intuitive navigation.

The primary advantages of this invention over prior art include increased content visibility, enabling over 40 images to be displayed simultaneously; enhanced interactivity, allowing users to efficiently navigate through a large volume of content; and an immersive browsing experience that improves user retention and satisfaction. Additionally, the system supports real-time content updates, dynamic content presentation, and AI-driven recommendations based on user interactions, significantly improving the efficiency and personalization of content navigation.

The invention's versatile application extends across various digital platforms where user-generated content is displayed, including social media, online galleries, and educational platforms. Its innovative design and operational capabilities can be adapted to different content types and user preferences, offering broad applicability and potential for future development in digital content interaction.

DETAILED DESCRIPTION

Embodiments described herein include systems and methods for displaying and interacting with images within a 3D environment on digital platforms.

In one embodiment the invention utilizes code architecture featuring two critical Swift files: PortalView.swift and PortalScene.swift. These files contain: constants comprising: background color, camera settings, item rendering parameters, and arrangement constraints; properties comprising: nextRenderPosition and previousRenderPosition to keep track of the next and previous positions where new items will be rendered, cameraNode to represent the virtual camera in the scene, currentCameraMoveDuration which tracks the current duration for virtual camera movement animations, scrollFinishedOrStopped which indicates whether scrolling is finished or stopped, initialization which initializes the scene by creating a virtual cameranode; and methods comprising: setupScene( ) to set up the background color of the scene, createCamera( ) to create a virtual cameranode with specified settings, updateCameraMove (with: swipedBackward:) to update the camera's position with animations based on the given duration, enableCameraMovement(:) to enable or disable virtual camera movement animations, changeCameraZ(addZ:) to change the camera's Z position, addNewItems(:renderingFrontItems:) to add new items to the scene, determining their positions based on rendering direction, downloadOrLoadImageFromCache(_:) to download or load images asynchronously from a given URL, prefetchImages(resources:) to prefetch images asynchronously for better performance, fetchImageFromCache(resource:) to fetch images asynchronously from cache or network, removeItemsIfNeeded(isRenderingFrontItems:) to remove items from the scene if needed based on rendering direction and distance, removeTiles(withZLowerThen:withZHigherThen:) to remove tiles from the scene based on Z position, createTile(image:minZ:maxZ:postId:) to create a tile (3D object) with an image at a specified position, and createAppShapePath( ) to create a path for the shape of the tile.

Figure 1:
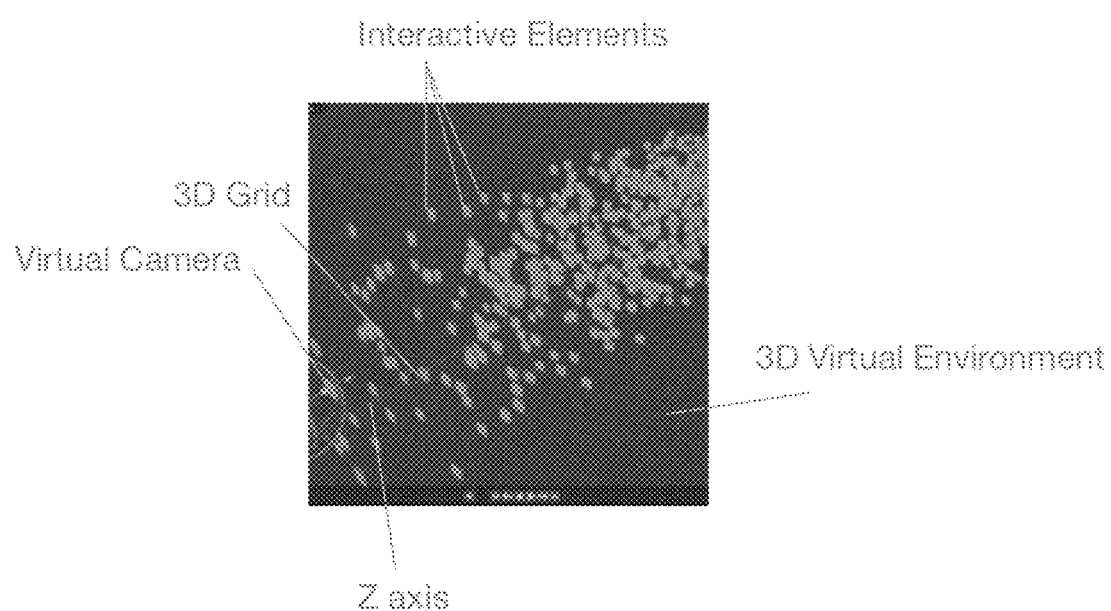
FIG. 1 depicts an embodiment of the 3D grid space.

FIG. 1 depicts an embodiment of the 3D virtual environment designed to enhance the presentation and navigation of user-generated content. Interactive elements are depicted as customized vector shapes (in this embodiment rounded rectangles) and the virtual camera is illustrated facing parallel along the Z axis.

The interactive elements are organized in a 3D grid via the iOS SceneKit library. The library is used to construct a digital environment wherein a matrix of interactive elements can be arranged across the X, Y, and Z axes. A key feature of this configuration is the, randomized positioning of elements along the Z axis, achieved through methods such as addNewItems(_:renderingFrontItems:) for adding new interactive elements and createAppShapePath( ) to define their unique vector shapes. In some embodiments this strategic arrangement is accompanied by a filtering or sorting algorithm to further customize the spatial organization of interactive elements and their associated user-generated content.

In another aspect dynamic content management, is handled through the utilization of Swift's robust 3D rendering capabilities and SceneKit's efficient management of 3D objects and animations. In some embodiments the system's architecture allows for the seamless integration and display of a vast array of user-generated content, ensuring that the digital scene remains up-to-date. Methods such as downloadOrLoadImageFromCache(_:) for fetching images and prefetchImages(resources:) for optimizing loading times can be utilized to maintain a fluid and rich content presentation.

Furthermore, content management and optimization strategies, including asynchronous image downloading and the dynamic removal of off-screen elements via removeItemsIfNeeded(isRendering FrontItems:), ensure the platform remains responsive and efficient, offering an unparalleled user experience in exploring and interacting with user-generated content.

Figure 2:
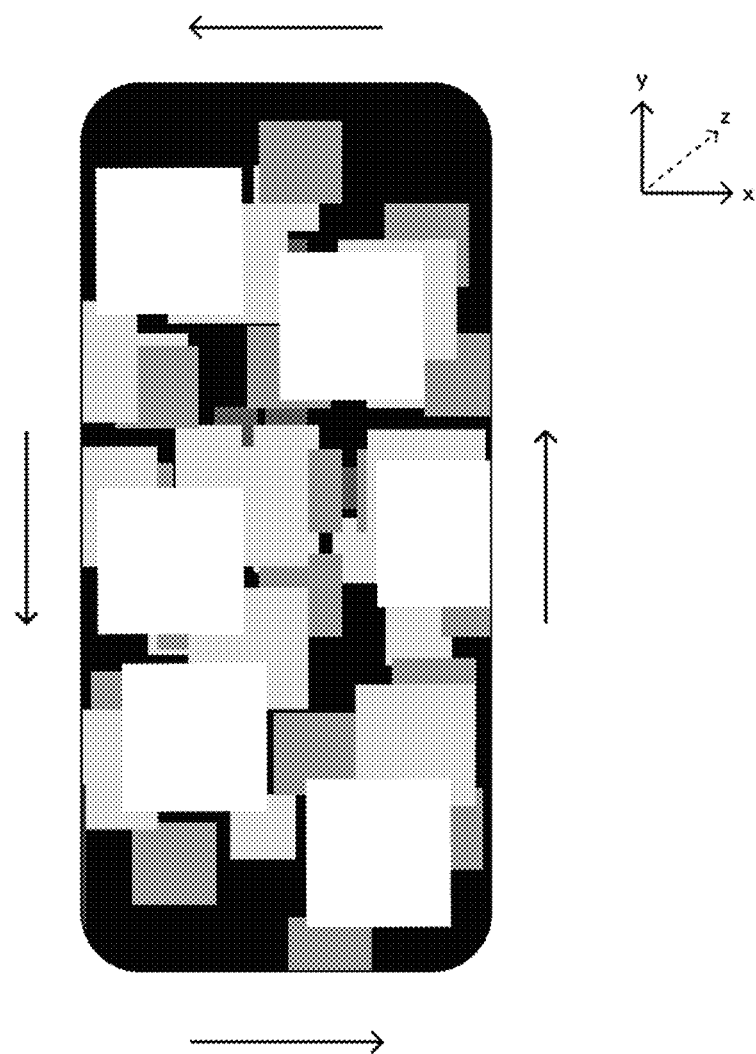
FIG. 2 depicts the front of the display device, illustrating the user interface.

FIG. 2 depicts the front of the display device, illustrating the user interface and subsequently the view of the virtual camera as it moves through the 3D environment along the Z axis. Every square depicted represents an interactive element. The squares display a preview of media content including but not limited to videos, images, and links. The squares have been used for illustration purposes and can be replaced with rectangles, circles, triangles, rounded rectangles, or other shapes. The varying degree of darkness of each square represents its apparent distance from the user in 3D space. Closer interactive elements will embody lighter colors to convey their proximity to the user.

In various embodiments the system utilizes a plurality of gesture recognition methods native to iOS development to efficiently process user inputs, such as swipes and taps, to navigate the 3D grid. Operational dynamics may be further characterized by features such as simulated virtual camera movement, which can be orchestrated using methods defined in PortalScene.swift for like changeCameraZ(addZ:) to adjust the camera's depth position, and enableCameraMovement(_:) to toggle animation effects.

In this example, the virtual camera exhibits automatic panning wherein it automatically pans forward in the Z direction without user interaction thereby effortlessly delivering content to the user. This panning can be augmented by user input wherein swiping up in the Y plane causes the virtual camera to move in the positive Z direction and swiping down in the Y plane causes the virtual camera to move in the negative Z direction. This simulated movement, coupled with the strategic arrangement of the 3D grid, significantly enhances content visibility and interactivity. In some embodiments tapping on the interactive elements will guide the user to a scroll-based content feed further display the associated content and browse related content via the conventional scrolling interface.

Figure 3:
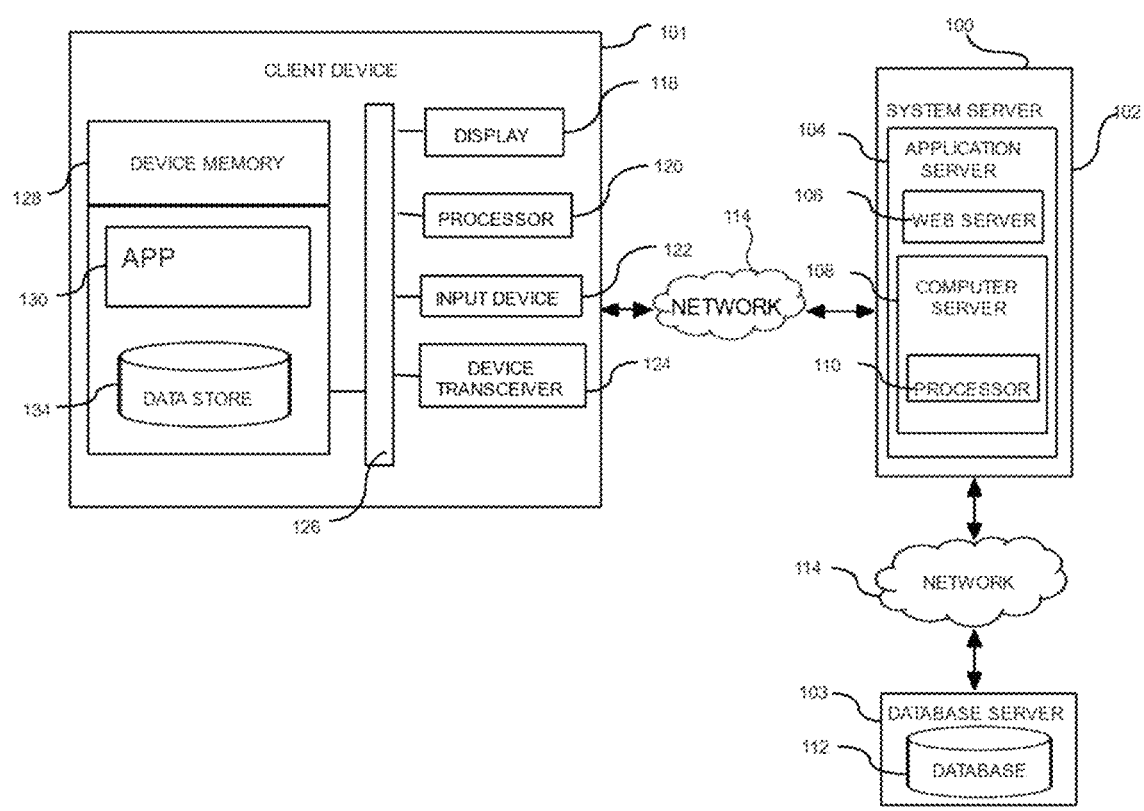
FIG. 3 depicts the client-server application system.

FIG. 3 illustrates the general architecture of a client-server application system 100 that operates in accordance with embodiments of the present invention, incorporating enhancements for navigating and displaying user-generated content within a 3D digital environment. While a client-server architecture is shown, other embodiments may use a peer-to-peer architecture, where functionality of the server resides in each client device. In a preferred embodiment, system 100 is implemented in multi-tier or n-tier architecture with one or more client devices 101, residing at the client tier, one or more servers 102 in the middle or server application tier and one or more database servers 103 residing in the database tier. In the above variant of three-tier architecture the client, the first tier, may have to only perform the user interface i.e., validate inputs; in which case the middle tier holds all the backend logic and does data processing while the data server, the third tier, performs data validation and controls the database access to present content to users.

The architecture of the platform of the present invention is described below. Users interact with each other through system 100 using client devices 101. Multiple client devices 101 are connected to system server 102 via a network 114 and can be implemented on any suitable computing platform selected the user. Server 102 communicates with the client devices 101 over the network 114 to present a user interface or graphical user interface (GUI) for system 100 of the present invention. The user interface of system 100 of the present invention can be presented through a web browser or through another suitable software application communicating with server 102 and is used for displaying, entering, publishing, and/or managing data required for the service as the dashboard referred to above. As used herein, the term "network" generally refers to any collection of distinct networks working together to appear as a single network to a user. The term also refers to the so-called world wide web, network of networks or Internet which is connected to each other using the Internet protocol (IP) and other similar protocols. As described herein, the exemplary public network 114 of FIG. 9 is for descriptive purposes only.

Although the description may refer to terms commonly used in describing public networks such as the Internet, the description and concepts equally apply to other public and private computer networks, including systems having architectures dissimilar to that shown in FIG. 9. The inventive idea of the present invention is applicable for all existing wireless network topologies or respective communication standards, such as GSM, UMTS/HSPA, 802.11, LTE, 4G, 5G cellular networks and the like.

With respect to the present description, server 102 may include any service that relies on a database system that is accessible over a network, in which various elements of hardware and software of the database system may be shared by one or more users of the system 100.

The GUI or user interface dashboard provided by server 102 on client devices 101 through a web browser or app may be utilized for utilizing service system 100 and includes the screens shown above in which the user operates the app of the present invention.

The components appearing in system server 102 refer to an exemplary combination of those components that would need to be assembled to create the infrastructure to provide the tools and services contemplated by the present invention. As will be apparent to one skilled in the relevant art(s), all of components inside of system server 102 may be connected and may communicate via a wide or local area network (WAN or LAN).

The system server 102 includes an application server or executing unit 104. The application server or executing unit 104 comprises a web server 106 and a computer server 108 that serves as the application layer of the present invention.

The Web server 106 is a system that sends out Web pages containing electronic data files in response to Hypertext Transfer Protocol (HTTP) requests from remote browsers (i.e. browsers installed in the client devices 101) or in response to similar requests made through a software application of the present invention installed on a client device 101. The web server 106 can communicate with the app of the present invention and/or with a web browser installed on a client device 101 to provide the user interface required for the service.

The computer server 108 may include a processor 110, a random-access memory (RAM) (not shown in figures) for temporary storage of information, and a read-only memory (ROM) (not shown in figures) for permanent storage of information. Computer server 108 may be generally controlled and coordinated by operating system software. The operating system controls allocation of system resources and performs tasks such as processing, scheduling, memory management, networking, and I/O services, among (other) things. Thus, the operating system resides in system memory and, on being executed by CPU, coordinates the operation of the other elements of server 102.

Although the description of the computer server 108 may refer to terms commonly used in describing computer servers, the description and concepts equally apply to other processing systems, including systems having architectures dissimilar to that shown in FIG. 9. FIG. 9 thus is provided for sufficiently enabling the preferred embodiment of the present invention but is not the only architecture upon which the present invention may be implemented.

The database tier is the source of data where at least one database server 103 generally interfaces multiple databases 112. Those databases are frequently updated by their users and administrators most often through a combination of private and public networks 114 including the Internet. While it has been described herein that the data being stored in a single database, different separate databases can also store the various data and files of multiple users.

A software application, or "app," is a computer program that may be downloaded and installed in client device 101 using methods known in the art. App 130, custom-built for the present invention, enables one or more persons to do various tasks related to maintaining the platform of the present invention. The activities related to the service of the present invention can also be performed using the user interface (or GUI) presented through a client device-based web browser. Hereinafter, the term "user interface" is used to refer to both app user interface and the web browser user interface of the present invention.

Examples of client device 101 may include, but not limited to, mobile devices, tablets, hand-held or laptop devices, smart phones, personal digital assistants, desktop computers, wearable devices, augmented reality glasses, virtual reality headsets, or any similar device.

As illustrated in FIG. 9, the client device 101 may include various electronic components known in the art for this type of device. In this embodiment, the client device 101 may include a device display 118, a computer processor 120, a user input device 122 (e.g., touch screen, keyboard, microphone, and/or other form of input device known in the art), a device transceiver 124 for communication, a device memory 128, the AR app 130 operably installed in the computer memory 128, a local data store 134 also installed in the device memory 128, and a data bus 126 interconnecting the aforementioned components. For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the claimed invention.

An alternative embodiment of the client-server application system may feature the same key elements and systems detailed in FIG. 9 but incorporate enhancements for navigating and displaying user-generated content within a 3D digital environment. The client device 101 features a display 118 that is optimized for high-resolution rendering of complex 3D graphics together forming a display device. The client device 101 also incorporates a responsive touch screen into the input device 122 for detecting various user gestures for navigating through the 3D environment.

Additionally, one or more processing units 120 may be configured for generating the 3D grid, managing a Virtual camera, and processing user interactions with high-performance computing resources. This embodiment includes an AI-driven recommendation engine for personalised content delivery, integrated within the server application tier 104 to dynamically rearrange content within the 3D grid based on variables comprising: searchs terms, connections, likes, shares, and time spent viewing content.

The embodiments described above are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A computer-implemented method for displaying and interacting with user-generated content in a 3D environment, comprising: arranging a plurality of interactive elements in a 3D grid along X, Y, and Z axes within a digital scene, wherein each interactive element represents user-generated content; positioning a virtual camera within said digital scene to face the 3D grid along one of the axes; automatically panning the virtual camera through the 3D grid to display the interactive elements to a user; detecting a user interaction with at least one of the interactive elements; dynamically rearranging the order and spatial arrangement of the interactive elements within the 3D grid based on user interactions with the content, comprising likes, comments, shares, and viewing time; and in response to the user interaction, displaying a content feed related to the user-generated content represented by the interacted interactive element.

2. The computer implemented method of claim 1, wherein the user interface also recognizes gestures to augment the motion of the virtual camera.

3. The computer-implemented method of claim 1, wherein the interactive elements are customizable vector shapes arranged to form a matrix on the XY plane, further extending variably along the Z axis.

4. The computer-implemented method of claim 1, wherein the virtual camera automatically pans forward in the 3D environment.

5. The computer-implemented method of claim 4, wherein the adjustment of the virtual camera's automatic panning includes varying the speed of movement through the 3D grid, allowing for slower or faster navigation based on the user's preference or the density of interactive elements.

6. The computer-implemented method of claim 1, wherein the interactive elements are further configured to display real-time updates of the user-generated content, enabling dynamic content presentation.

7. The computer-implemented method of claim 1, further comprising applying a filtering or sorting algorithm to the interactive elements based on pre-selected or user-defined criteria.

8. The method of claim 1, further comprising allowing the virtual camera to move in multiple directions within the 3D grid space, including lateral movements along the X, Y and Z axes.

* * * * *